United States Patent [19]

Petit et al.

[11] E Patent Number: Re. 33,026

[45] Reissued Date of Patent: Aug. 22, 1989

[54] PROCESS AND DEVICE FOR VAPORIZING A LIQUID BY HEAT EXCHANGE WITH A SECOND FLUID AND THEIR APPLICATION IN AN AIR DISTILLATION INSTALLATION

[75] Inventors: Pierre Petit, Chatenay Malabry; Maurice Grenier, Paris; Jean-Francois Deschamps, Bures-sur-Yvette, all of France

[73] Assignee: L'Air Liquide, Societe Anonyme Pour l'Etude et l'Exploitation Des Procedes Georges Claude

[21] Appl. No.: 236,006

[22] Filed: Aug. 23, 1988

Related U.S. Patent Documents

Reissue of:

[64] Patent No.: 4,599,097
Issued: Jul. 8, 1986
Appl. No.: 620,078
Filed: Jun. 12, 1984

[51] Int. Cl.[4] ..... F25J 3/00

[52] U.S. Cl. ..... 62/36; 165/166

[58] Field of Search ..... 62/36, 42, 43, 9, 11; 165/7, 140, 166

[56] References Cited

U.S. PATENT DOCUMENTS 3,992,168 11/1976 Toyyama et al. ..... 62/36

FOREIGN PATENT DOCUMENTS 28509 11/1972 Australia .

*Primary Examiner*—Ronald C. Capossela
*Attorney, Agent, or Firm*—Young & Thompson

[57] ABSTRACT

Liquid oxygen of a low pressure column forms a bath 5 at the top of a heat exchanger 2 of the type having plates defining vertical passages 17, 18. This liquid is predistributed along every other passage 17 by a series of apertures 27 formed for example in the plates, and then is uniformly distributed in a fine manner in the same passages by a packing 24 so as to form a continuous running liquid film. The gaseous nitrogen of a medium pressure column is introduced into the remaining passages 18 and condensed by heat exchange with the oxygen which is vaporized.

24 Claims, 5 Drawing Sheets

PROCESS AND DEVICE FOR VAPORIZING A LIQUID BY HEAT EXCHANGE WITH A SECOND FLUID AND THEIR APPLICATION IN AN AIR DISTILLATION INSTALLATION

Matter enclosed in heavy brackets [ ] appears in the original patent but forms no part of this reissue specification; matter printed in italics indicates the additions made by reissue.

The present invention relates to the vaporization of a liquid by heat exchange with a second fluid by means of a heat exchanger of the vertical plate type. It is in particular applicable to air distillation installations.

In air distillation installations of the type having a double column, the liquid oxygen in the bottom of the low pressure column is vaporized by heat exchange with gaseous nitrogen taken from the head of the medium pressure column. For a given operating pressure of the low pressure column, the temperature difference between the oxygen and the nitrogen rendered necessary by the structure of the heat exchanger imposes the operating pressure of the medium pressure column. It is therefore desirable to arrange that this temperature difference be as small as possible so as to minimize costs related to the compression of the air to be treated injected into the medium pressure column.

For this purpose, it has been proposed to supply the heat exchanger with liquid oxygen from the upper end by ensuring the running of this liquid along tubes of great length (up to about 6 m).

Remarkable performances have been achieved in this way from the heat exchange point of view, but at the cost of serious technical difficulties. Indeed, in particular when large flows of oxygen must be treated, problems are encountered in the construction of a multitude of long tubes resisting the exterior pressure of the nitrogen and other problems are encountered which are related to the presence of thick stainless steel end plates.

An object of the invention is to provide means for achieving heat exchange performances which are at least just as good but in a more reliable and cheap manner.

The invention therefore provides a process for vaporizing a liquid by heat exchange with a second fluid by means of a heat exchanger comprising a parallelepipedal body formed by an assembly of parallel vertical plates defining therebetween a multitude of flat passages, said process being of the type in which the liquid is sent into a first group of passages and the second fluid is sent into the remaining passages, characterized in that it comprises distributing the liquid in two stages at the upper end of the passages of said first group throughout the horizontal length of the last mentioned passages, the two stages comprising a rough predistribution of the liquid throughout the length of the passages of said first group, then a fine distribution throughout the length of these passages of the thus predistributed liquid. Preferably, the supply of liquid is adapted to ensure permanently the presence of a liquid film on substantially the entire extent of the walls contained in each of the passages of said first group.

The invention also provides a heat exchanger for carrying out such a process. This exchanger comprises means for predistributing the liquid opening onto means for effecting a fine distribution of the liquid located at the upper end of each of the passages of said first group.

In a particularly effective embodiment of the exchanger according to the invention, the predistribution means comprise in particular a horizontal row of apertures, and retaining means for forming a bath of liquid above these openings; the fine distribution means may comprise a packing, or, when said openings are provided in the plates of the exchanger, a surface for spreading the jets of liquid issuing from these openings.

The invention also provides an air distillation installation of the type having a double column, in which the liquid of the bottom of the medium pressure column is put into thermal exchange relation with the gas of the head of the low pressure column by means of a heat exchanger of the type defined hereinbefore, said installation comprising supply means for supplying the liquid to said predistribution means and means supplying gas to the passages of said second group.

Several embodiments of the invention will now be described with reference to the accompanying drawings. In these drawings.

In the various embodiments which will be described hereinafter, the same references will designate identical or corresponding elements.

Figure 1:
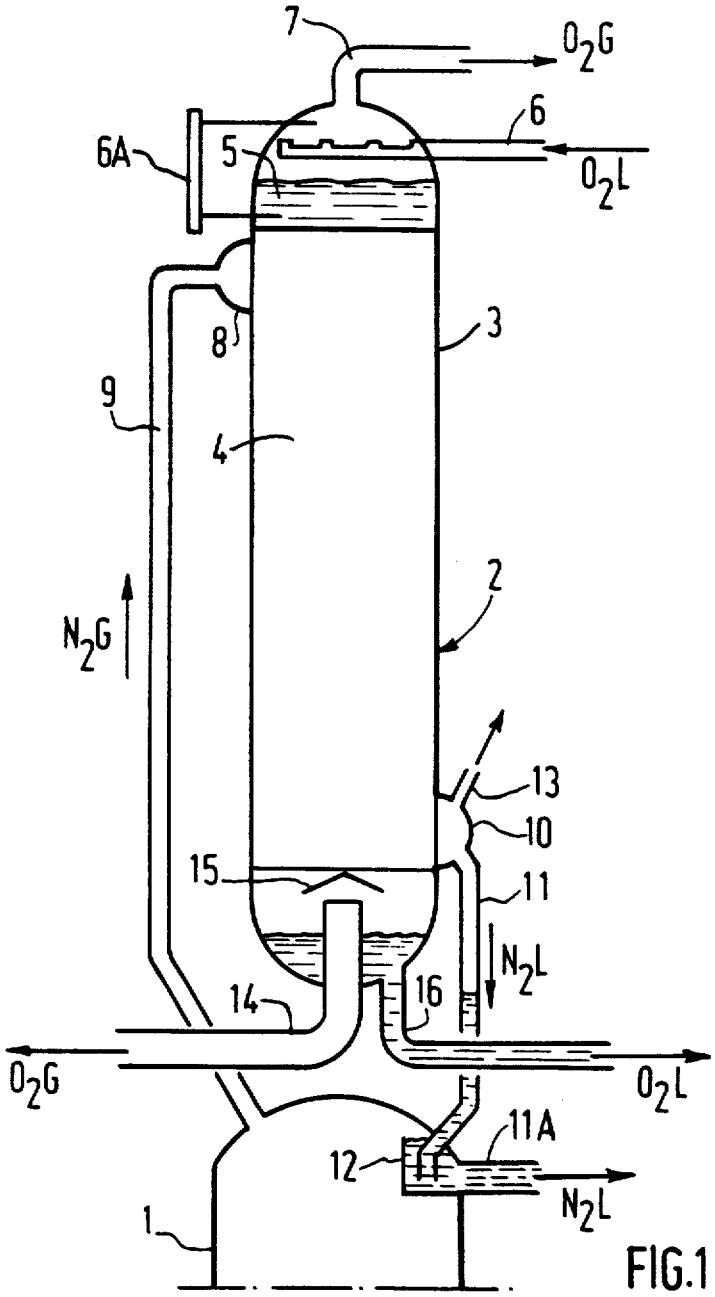
FIG. 1 is a partial diagram of an air distillation installation according to the invention.

FIG. 1 illustrates a possible incorporation of an oxygen-nitrogen heat exchanger in an air distillation installation having a double column. This installation comprises a medium pressure column 1 at the base of which the air to be treated is injected at a pressure of the order of 6 bars (absolute). The liquid enriched with oxygen which is collected at the bottom of the column 1 is refluxed in the middle of the height of a second column (not shown) termed a low pressure column, which operates slightly above atmospheric pressure. The gaseous nitrogen located at the head of the column 1 is put into heat exchange relation with the liquid oxygen collected at the bottom of the low pressure column; the resulting condensed nitrogen serves as a reflux in the column 1 and the low pressure column, while the resulting vaporized oxygen is sent to the bottom of the low pressure column.

The heat exchange between the oxygen and the nitrogen occurs in an exchanger 2 which is mounted above the column 1, while the low pressure column is in juxtaposed relation to the latter.

The exchanger 2 is formed by a fluidtight case 3 the essential part of the height of which contains an assembly of parallel plates 4 of aluminum having a rectangular shape, a length of the order of 1 to 1.5 m and a height of 3 to 6 m, between which corrugations also of aluminium are fixed by brazing.

The space located above the plates 4 encloses a bath of liquid oxygen 5 supplied through a pipe 6 coming from the bottom of the low pressure column and provided with a pump (not shown). The latter may be controlled by a level regulator of the bath 5 which has been diagrammatically represented by a level measuring tube 6A, or, by way of a modification, by a flow regulator. Provided at the top of the exchanger 2 is a pipe 7 for returning to the base of the low pressure column oxygen vaporized above the bath 5, resulting from entries of heat in the region of the pump and the piping.

The assembly of plates 4 is supplied in its upper part with gaseous nitrogen through a horizontal feed box 8 which communicates through a pipe 9 with the head of the medium pressure column 1. The condensed nitrogen is discharged at the base of the plates 4 by a horizontal collector box 10 which communicates through a pipe 11 with a liquid sealed trough 12 disposed at the head of column 1. Connected to the box 10 is a pipe 13 for discharging uncondensable rare gases.

A pipe 14 connects the bottom of the low pressure column to the space in the case 3 below the plates 4. This pipe extends vertically into this space through the lower point of the case 3 and its upper end is surmounted by a conical deflector 15. Extending from the bottom of the case 3 is also a pipe 16 for returning excess liquid oxygen to the bottom of the low pressure column.

The structure of the active part of the exchanger 2, i.e. the assembly of plates 4, will now be described with reference to FIG. 2.

In this region of the exchanger the case 3 has a parallelepipedal shape. The plates 4 define a multitude of passages alternately for the flow of oxygen (passages 17) and for the flow of nitrogen (passages 18). In the major part of their height, the passages 17 and 18 each contain a corrugation or wave 19 formed by a perforated aluminum sheet corrugated with vertical generatrices.

The corrugations 19 of the nitrogen passages terminate both at the top and the bottom before the corrugations 19 of the oxygen passages. At the base of the plates 4, these corrugations of the passages 18 are extended by oblique corrugations for collecting nitrogen (not shown) which lead to the entrance of the collector box 10. At their upper end, these corrugations 19 are extended by nitrogen distributing oblique corrugations 20 which open onto the outlet of the feed box 8. Above the corrugations 20, the nitrogen passages 18 are closed by horizontal bars 21. Similar bars close the lower end of the nitrogen passages below the nitrogen collecting zones. Above the bars 21, each nitrogen passage comprises a liquid oxygen reservoir 22 containing a vertical corrugation 23 which is made from perforated aluminum sheet and has vertical generatrices, the thickness and the pitch of which are distinctly greater than those of the corrugations 19. The corrugations 23 have for sole function to provide spacing means between the plates 4 so as to permit the assembly of the exchanger by a single brazing operation. The reservoirs 22 are open in the upper part so as to communicate with the liquid oxygen bath 5. The corrugations 19 of the oxygen passages 17 extend downwardly to the lower end of the plates 4 so that these passages are downwardly open. These corrugations extend upwardly to the upper edge of the bars 21 and then are extended by a lining 24. The latter is formed by a corrugation of the "serrated" type which is illustrated in more detail in FIG. 6.

Figure 6:
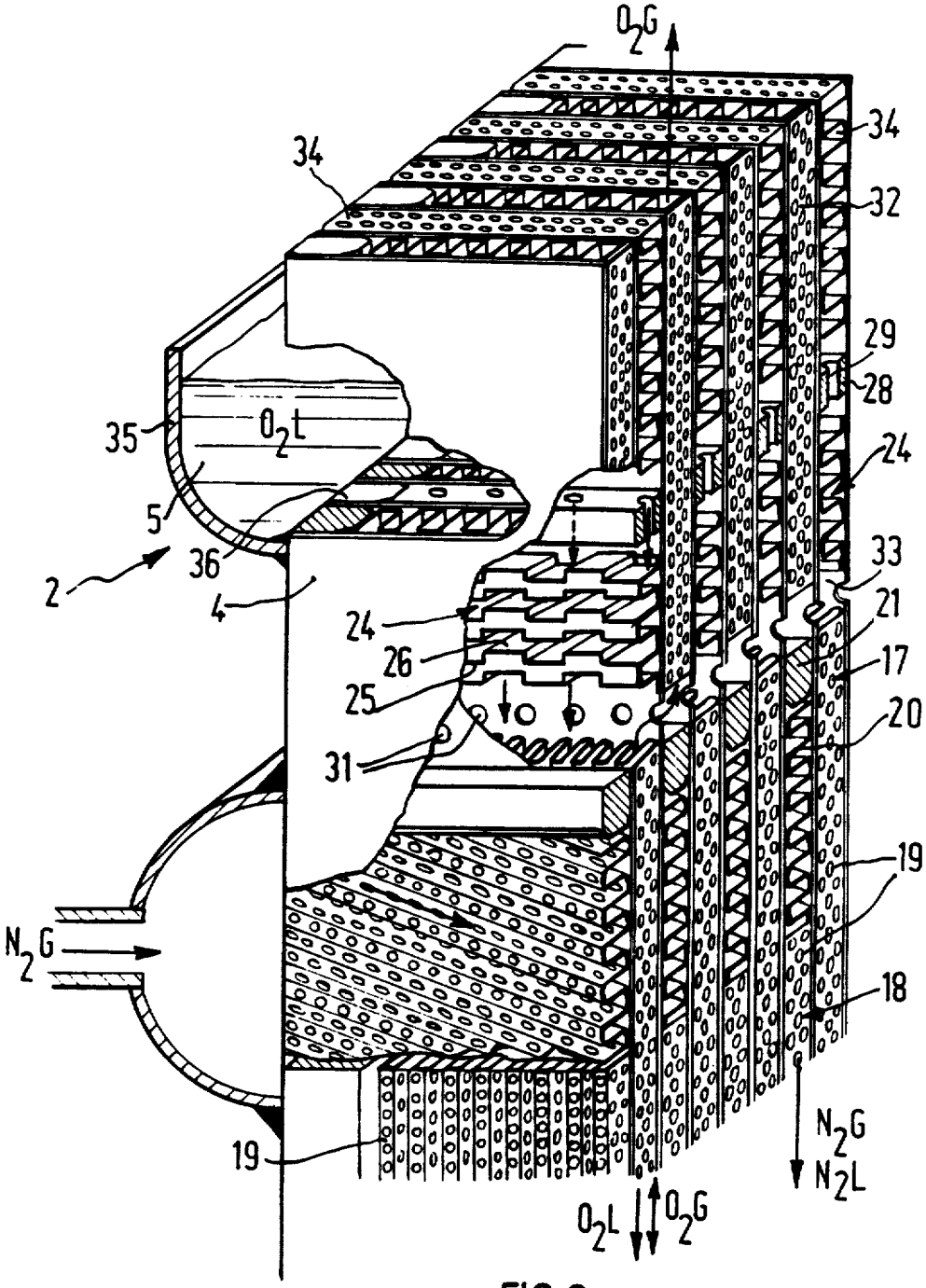
FIG. 6 is a partial perspective view, with parts cut away, of another heat exchanger according to the invention.

As shown in FIG. 6, the corrugation 24 is a non-perforated aluminum sheet having horizontal generatrices (arrangement termed "hard way" relative to the flow of the liquid oxygen). At regular intervals, each horizontal or pseudo-horizontal face 25 of the corrugation 24 is provided with a sheared portion 26 which is upwardly offset by a quarter of a corrugation pitch. The width of the sheared portions 26, measured along a generatrix of the corrugation, is of the same order as the distance between each one thereof and two adjacent sheared portions located on the same face 25.

Returning to FIG. 2, each plate 4 comprises above the packing 24, a horizontal row of apertures 27 evenly spaced apart throughout the length of the exchanger, the apertures of successive plates being disposed at the same height but in staggered relation. By way of a modification, these apertures could be moreover provided only in every other plate. Just above these apertures, the oxygen passages are closed by horizontal bars 28 disposed at the upper end of plates 4. In order to avoid risk of obstruction of certain apertures 27 by the corrugations 23, the latter are interrupted on a short height in the region of said apertures.

In operation, the device regulating the feed pump feeding liquid oxygen to the exchanger 2 maintains a level of the bath 5 above the plates 4 which is sufficient to overcome the various pressure drops which oppose the flow of oxygen. The head of liquid oxygen above the plates 4 is for example of the order of 20 cm.

The liquid oxygen fills the reservoirs 22 and passes through the apertures 27 at a rate of flow defined by the section of these apertures and by the liquid head thereabove. As this head is constant in an established operation, the flow of liquid oxygen is that delivered by the pump raising this liquid. The apertures 27 therefore effect a rough predistribution of the liquid oxygen all along the passages 17, and the liquid oxygen predistributed in this way reaches the packing 24 which ensures a fine distribution throughout the length of each passage 17. The liquid oxygen thus reaches the corrugations 19 by running in a perfectly uniform manner along all the walls (corrugations 19 and plates 4) of the passages provided therefor, i.e. by forming a continuous descending film on these walls.

At the same time, the gaseous nitrogen reaches the exchanger through the box 8 and the distribution corrugations 20, then flows downwardly along the passages 18. In doing so, it progressively gives up heat to the liquid oxygen located in the adjacent passages 17 so that the oxygen is vaporized and the nitrogen is simultaneously condensed.

The condensed nitrogen is collected in the box 10 and flows in the pipe 11 to the channel 12. When the head of liquid nitrogen in the pipe 11 is sufficient to overcome the pressure prevailing in the medium pressure column 1, this liquid overflows the channel and is refluxed in the medium pressure column after a part has been taken off through the pipe 11A to ensure the refluxing of the low pressure column. A suction is created in this way in the passages 17 which ensures the circulation of the nitrogen.

The flow of liquid oxygen is so regulated as to guarantee an excess of liquid oxygen throughout the height of the plates 4. Indeed, a total vaporization of the oxygen in the region of the passages 17 would result at this place in a concentration of acetylene dissolved in the liquid oxygen which could cause a local explosion. Apart from this risk of explosion, a lower performance of the exchanger would also result owing to the neutralization of the non-wetted surface. This risk is limited by the high effectiveness of the fine distribution ensured by the packing 24. However, for reasons of safety, it is preferred to employ an excess of liquid oxygen, usually of the same order as the vaporized oxygen flow.

Consequently, a diphase gaseous oxygen-liquid oxygen mixture issues from the lower end of the passages 17; this mixture is separated in the lower part of the case 3, the liquid and vapour phases returning respective to the bottom of the low pressure column through the pipes 16 and 14.

The applicant has found that such an exchanger can operate in a perfectly reliable manner with a very small temperature difference, of the order of 0.5° C., between the nitrogen and the oxygen, which consequently enables the air entering the distillation installation to be compressed under very economical conditions.

Figure 2:
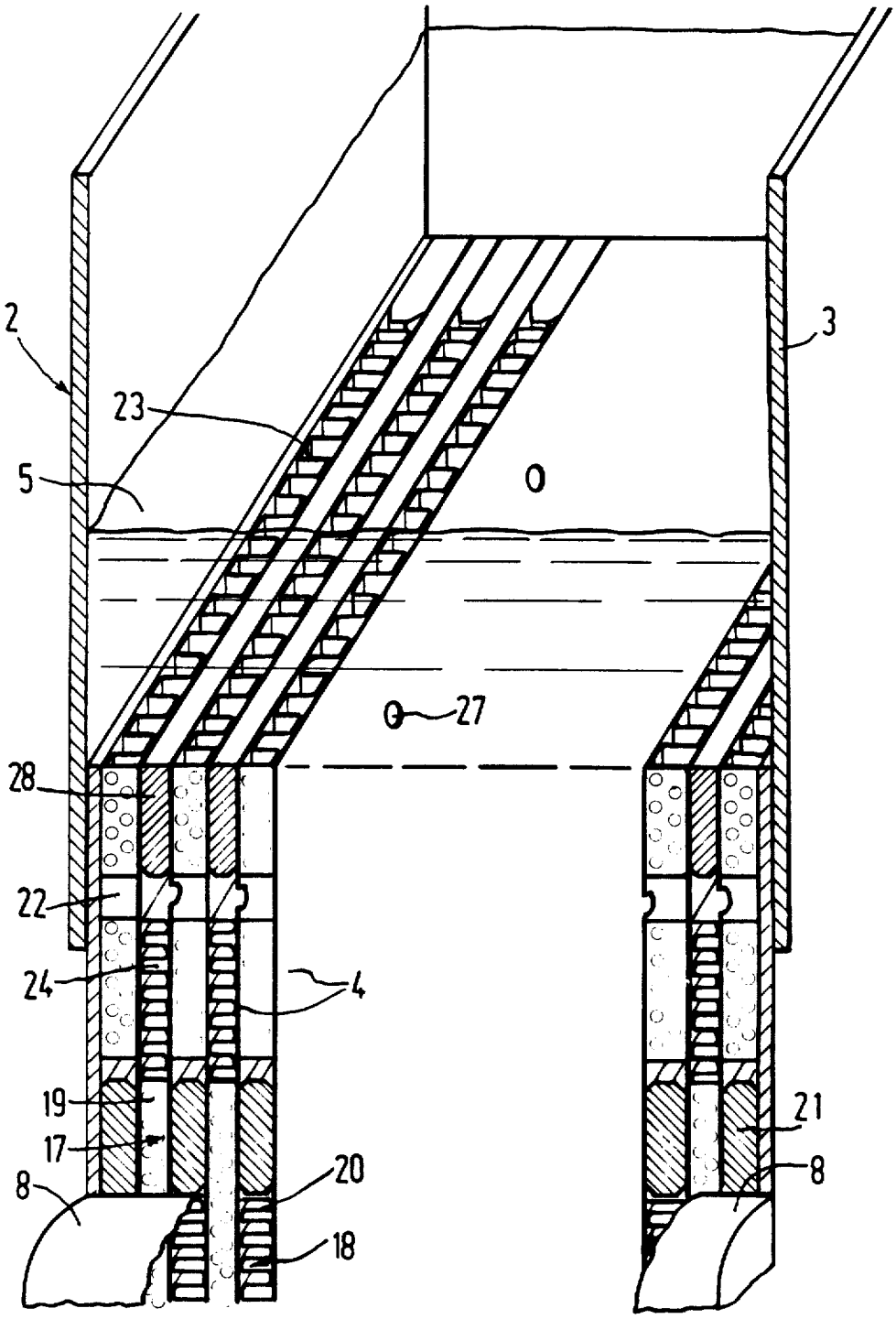
FIG. 2 is a partial diagrammatic perspective view, with a part cut away, of a heat exchanger used in the installation shown in FIG. 1.

In the embodiment shown in FIG. 2, it can be seen that the liquid oxygen is entirely distributed when the fluid arrives in the zone of heat exchange with the nitrogen. In the modification shown in FIG. 3, on the other hand, the oxygen is put into thermal exchange relation with the nitrogen right at the start of the fine distribution operation.

For this purpose, the bars 21 which provide the upper limit of the passages 18 are disposed at the upper end of the plates 4, as are the bars 28. Further, the apertures 27 are eliminated and replaced by vertical apertures 29 provided in evenly spaced relation in the bars 28, throughout the length of the latter.

In this modification, the liquid oxygen of the bath 5 flows through the apertures 29 at a rate of flow corresponding to the output of the liquid oxygen raising pump and is thus predistributed throughout the length of the passages 17. These liquids then fall onto the packing 24 located just below (this packing has been shown very diagrammatically in FIG. 3). As before, the packing 24 ensures a uniform fine distribution of the liquid oxygen throughout the length of passages 17, and this liquid thereafter runs along the corrugations 19 and the coresponding walls 4. The heat exchange between the oxygen and the nitrogen starts during the passage of the liquid oxygen through the packings 24, which are at the same level as the corrugations 20 distributing gaseous nitrogen.

Figure 4:
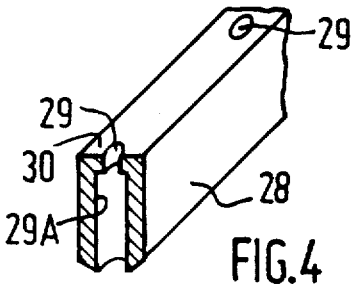
FIGS. 4 and 5 are respectively perspective views of two modifications of a detail of the exchanger shown in FIG. 3.

As illustrated in FIG. 4, the apertures 29 of the bars 28, instead of having a constant diameter throughout the height of these bars, may have a diameter enlarged in the major part of their height by a counter bore 29A effected from below.

Figure 5:
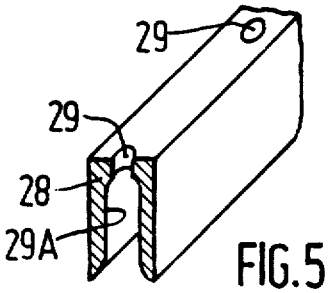

FIG. 5 shows that similar apertures may be obtained by perforation of the upper web 30 of U-section elements constituting the bars 28. The advantage of these two embodiments resides in the fact that the effective part of the apertures 29 which defines the section for the passage of the liquid oxygen is of short length and consequently less subject to stopping up or undesirable vaporization.

Figure 3:
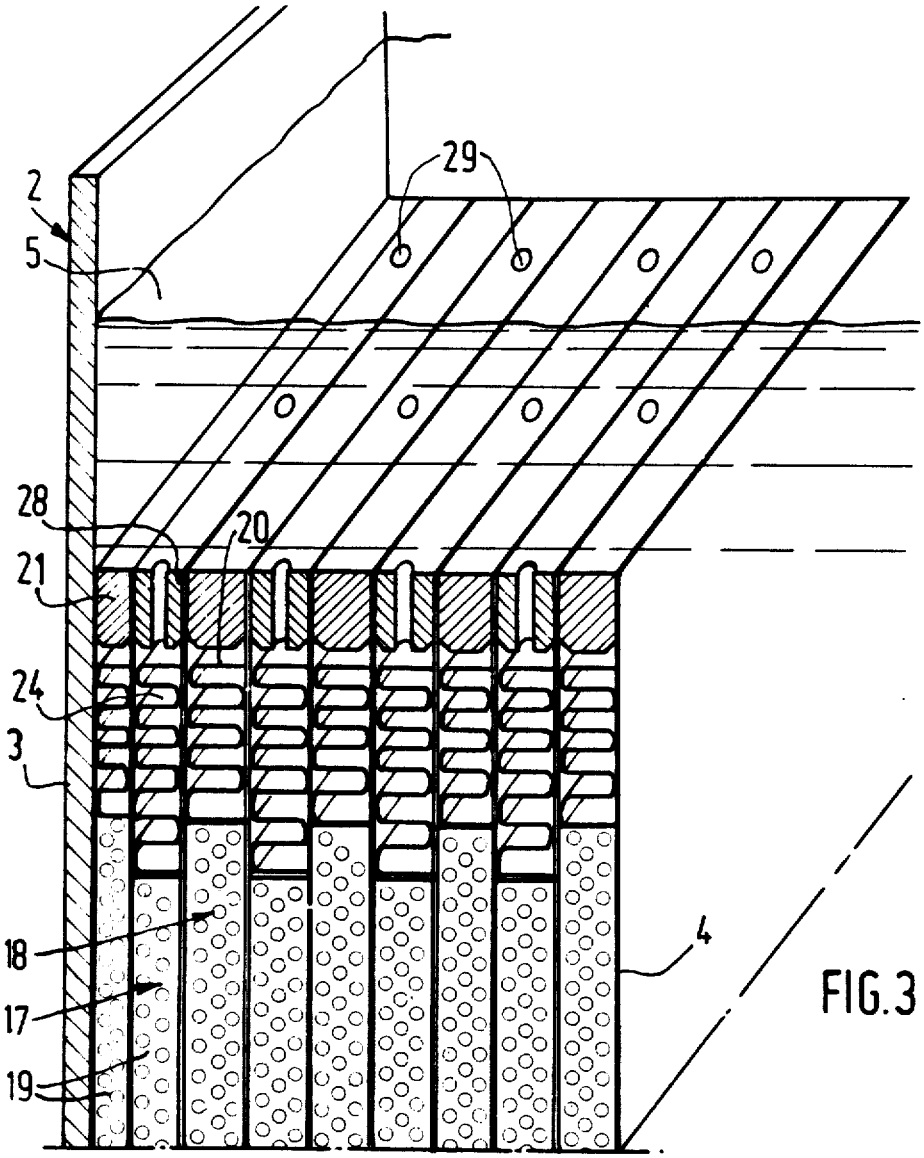
FIG. 3 is a similar view of a modification of the heat exchanger shown in FIG. 2.

In the heat exchangers shown in FIGS. 2 and 3, the vaporized oxygen is discharged through the base at the same time as the excess liquid oxygen. In this embodiment shown in FIG. 6, on the other hand, the vaporized oxygen is free to be discharged from both the top and bottom.

The exchanger shown in FIG. 6 is identical to that of FIG. 2, from the base of the plates 4 up to the level of the upper edge of the bars 21 which define the upper limit of nitrogen passages 18.

Just above these bars 21, each plate 4 has a horizontal row of apertures 31. Above the latter, the plates 4 extend for a great height up to a level higher than that of the free surface of the liquid oxygen bath 5. Disposed in the gaps above the bars 21 are corrugated spacer elements 32 having vertical generatrices similar to the corrugations of FIG. 2. In the remaining gaps, a free space 33 is provided in the region of the apertures 31 above the corrugations 19, and this space is surmounted upwardly by the previously-described packing 24, by a bar 28 having apertures 29 similar to those of FIG. 3, and by a corrugated spacer element 34 similar to the elements 32 but having horizontal generatrices.

The bath 5 is fed laterally by a feed box 35 located above the box 8 and opening into the spaces occupied by the corrugations 34. For this purpose, the bars 36 which close on this side the oxygen passages 17 extend upwardly only up to the level of the upper edge of the bars 28.

In operation, a suitable constant liquid oxygen level is maintained in the box 35. The bath 5 rises above the bars 28 and, as in FIG. 1, the liquid oxygen flows through the apertures 29 in packing 24 which distributes it in a fine and uniform manner, then the liquid runs in the passages 17 in heat exchange relation with the nitrogen contained in passages 18. The vaporized oxygen can be discharged either downwardly as before, or upwardly by passing through the apertures 31 and the spaces containing the corrugations 32, as indicated by the arrows in FIG. 6.

In this embodiment, by way of a modification, the passages 17 may also be closed at their lower end and receive the liquid oxygen by means of an oblique collector corrugation and a horizontal collector box connected by a pipe to the liquid oxygen bath at the bottom of the low pressure column. In this case, the entire vaporized oxygen issues from the exchanger through the top in the manner described hereinbefore.

Figure 7:
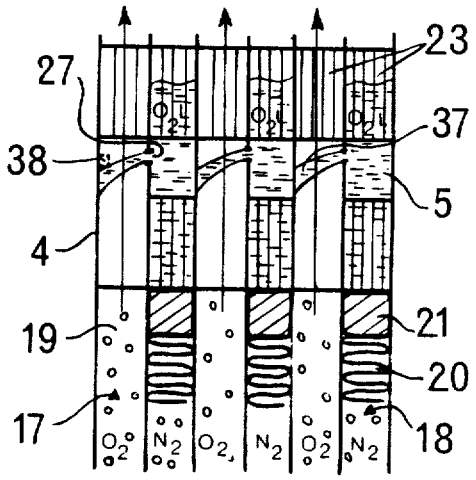
FIG. 7 is a diagrammatic sectional view of a part of a heat exchanger according to another embodiment of the invention.

The heat exchanger illustrated in FIG. 7 differs from that shown in FIG. 2 only in the manner in which the oxygen is distributed and discharged. In each passage 17, the packing 24 is eliminated; the jets of liquid oxygen 37 issuing from the apertures 27 strike the confronting plate 4 and spread over the latter. The spacing and the diameter are so chosen that the sheets of parabolic shape thus formed join into a continuous sheet a little above the thermal exchange corrugations 19. Thus, the oxygen is still predistributed by the apertures 27 while its fine distribution is ensured by the plates 4 themselves.

This manner of distribution is particularly simple and has the advantage of avoiding the creation of a large obstacle to the discharge of the vaporized oxygen through the upper end of the passages 17, as illustrated. The lower end of the passages 17 may then be either closed and provided with means for collecting the excess of liquid oxygen, or open so as to allow the gaseous oxygen also the possibility of being discharged from below.

In order to improve the spreading of the liquid oxygen jets on the plate 4, the surface condition of the latter may be locally modified, in particular by preferably horizontal ribbing, and/or by the provision of a horizontal obstacle 38 projecting from this plate above the jets, as shown in dotted lines. The improvement in the spreading of the jets permits, for a given rate of flow, the use of larger apertures 27 in a smaller number so that the risk of a stopping up of these apertures by particles in suspension in the liquid is reduced.

By way of a modification (FIG. 8) the zones for spreading the jets may be provided on additional plates 39 mounted on the plates 4.

Figure 8:
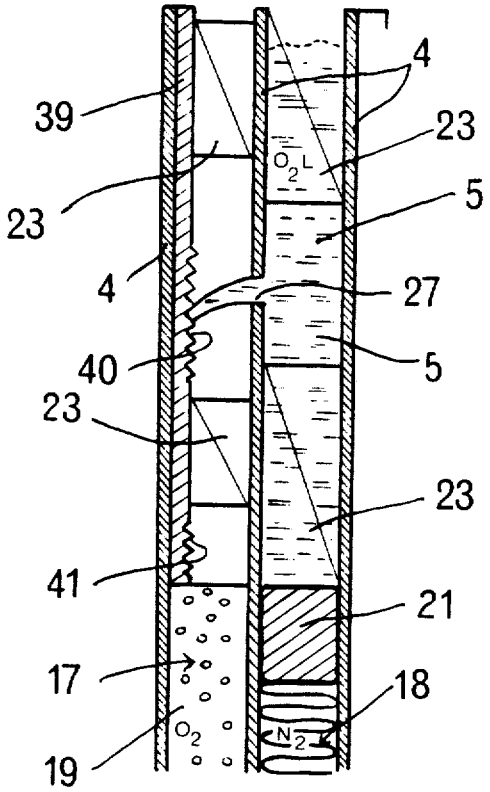
FIG. 8 is a similar view of a modification of the exchanger shown in FIG. 7.

The region of the exchanger located above the bars 21 requires no corrugation. For the purpose of assembling the exchanger by brazing, there may be disposed in this region, between the plates 4, spacer blocks which are thereafter removed, the plates 39 being if desired mounted subsequently. In another modification, as represented, there may be employed as spacer members corrugations 23 made from a thick sheet and having a large pitch; these corrugations being interrupted at the level of the apertures 27 and in the jet spreading zones. In FIG. 8, there has been shwon in the passages 17 a corrugation 23 in two parts, respectively above and below the apertures 27, with a ribbed zone 40 facing these apertures and another ribbed zone 41 between the corrugation 23 and the corrugation 19. This FIG. 8 moreover shows that such corrugations 23 enable the additional plates 39 to be simultaneously placed in position.

By way of a modification, apertures 27 may be provided in all the plates 4, with of course a suitable offset so as to supply each passage 17 with two sheets of liquid oxygen.

In each embodiment of the exchanger according to the invention, the nitrogen circuit is conventional. It can therefore be replaced by other known types of nitrogen circuits and in particular by those disclosed in the French Pat. No. 78 20,757 of the applicants' assignee.

Further, one or more heat exchangers according to the invention may be installed inside a double column of an air distillation installation whose low pressure column is superimposed on the medium pressure column.

What is claimed is:

1. A process comprising vaporizing a liquid by heat exchange with a second fluid by means of a heat exchanger designed to maintain no more than a small temperature difference between said liquid and said second fluid, including a parallelepipedal body formed by an assembly of parallel vertical plates defining therebetween a multitude of flat passages having generally vertical corrugated fins therein, by sending said liquid into a first group of said passages and sending the second fluid into a second group of passages constituting the remaining passages of said passages defined between said plates, distributing the liquid in two stages at an upper end of the passages of said first group of passages throughout the horizontal length of said first group of passages, said two stages comprising a rough predistribution of the liquid *through openings* throughout the length of passages of said first group of passages, and then a fine distribution of the thus predistributed liquid *through a packing* throughout the length of said passages, the two stages being performed above an upper end of said generally vertical corrugated fins.

2. A process according to claim 1, comprising adapting the liquid flow in such manner as to ensure permanently the presence of a liquid film on substantially the entire extent of all the walls contained in each of the passages of said first group of passages.

3. A process according to claim 1, comprising constraining the gas resulting from the vaporization of the liquid and the liquid in excess to leave the exchanger from the bottom of the exchanger.

4. A process according to claim 1, comprising taking the liquid from a bath of liquid provided at the top of the exchanger.

5. A process according to claim 4, wherein said bath of liquid is at a regulated level.

6. A process according to claim 4, wherein the passages of said first group of passages are put in communication with a free space located above the bath of liquid.

7. A process according to claim 1, comprising sending into said first group of passages an excess of liquid of the same order as the flow of vaporized liquid.

8. A process according to claim 1, wherein the liquid is liquid oxygen and the second fluid is gaseous nitrogen in the course of condensation.

9. A heat exchanger comprising means designed for vaporizing a liquid by heat exchange with a second fluid while maintaining no more than a small temperature difference between said liquid and said second fluid, said exchanger including a parallelpipedal body including an assembly of parallel vertical plates having walls defining therebetween a multitude of flat passages having generally vertical corrugated fins therein, said passages comprising a first group of said passages and a second group of passages constituting the remainder of said passages defined by said walls of said plates, means *defining openings* for effecting a rough predistribution of the liquid, means *comprising a packing* for effecting a fine distribution of the liquid, the means for effecting the predistribution of the liquid opening onto said means for effecting the fine distribution of the liquid which are disposed at an upper end of each of the passages of said first group of passages, both said means being disposed above an upper end of said generally vertical corrugated fins.

10. A heat exchanger according to claim 9, [wherein the predistribution means comprise means defining openings,] and retaining means for forming a bath of liquid above said openings.

11. A heat exchanger according to claim 10, wherein said openings are formed by a horizontal row of apertures.

12. A heat exchanger according to claim 10, wherein said retaining means comprise bars limiting the passages of said second group of passages at the upper end thereof at a given distance from the upper end of the vertical plates, said openings being provided in the plates above said bars.

13. A heat exchanger according to claim 12, wherein, for the purpose of putting the passages of said first group of passages in communication with a free space located above the bath of liquid, means are provided for putting a region of the passages of said first group of passages located below the fine distribution means in communication with the free space located above the bath of liquid, said plates extending to above the level of the bath of liquid, additional bars upwardly limiting the passages of said second group of passages, and said communication means comprising openings formed in said plates above said additional bars and below said fine distribution means.

[14. A heat exchanger according to claim 12, wherein said fine distribution means comprise a surface for spreading jets of liquid issuing from said openings.]

[15. A heat exchanger according to claim 14, wherein said spreading surface is ribbed.]

[16. A heat exchanger according to claim 15, wherein said spreading surface is ribbed horizontally.]

[17. A heat exchanger according to claim 14, wherein said spreading surface carries a projection located above the jets of liquid.]

18. A heat exchanger according to claim 10, wherein said retaining means comprise bars limiting the passages of said first group of passages at the upper end thereof, said openings being formed vertically in said bars.

19. A heat exchanger according to claim 18, wherein each opening is formed by a counter-bored aperture.

20. A heat exchanger according to claim 18, wherein said bar is an inverted U-section element having a web interconnecting two branches of the U, and a series of apertures is provided in said web.

21. A heat exchanger according to claim [18] 9, wherein the packing comprises a corrugation having horizontal generatrices and a partial vertical offset.

22. A heat exchanger according to claim 10, wherein, for the purpose of putting the passages of said first group of passages in communication with a free space located above the bath of liquid, means are provided for putting a region of the passages of said first group of passages located below the fine distribution means in communication with the free space located above the bath of liquid.

[23. A heat exchanger according to claim 9, wherein said fine distribution means comprise a packing.]

24. A heat exchanger according to claim 9, wherein said fine distribution means are disposed at the same level as a device for distributing the second fluid in the passages of said second group of passages.

25. A heat exchanger according to claim 9, wherein said fine distribution means are disposed entirely above a device for distributing the second fluid in the passages of said second group of passages.

26. An installation for separating air by distillation, said installation comprising a first distillation column operating at a relatively high pressure, a second distillation column operating at a relatively low pressure, and a heat exchanger for putting the liquid of the bottom of the second column in thermal exchange relation with the gas of the head of the first column, said heat exchanger comprising means designed to vaporize a liquid by heat exchange with a second fluid while maintaining no more than a small temperature difference between said liquid and said second fluid and including a parallelepipedal body including an assembly of parallel vertical plates having walls defining therebetween a multitude of flat passages having generally vertical corrugated fins therein, said passages comprising a first group of said passages and a second group of said passages constituting the remainder of said passages defined by said walls of said plates, means *defining openings* for effecting a rough predistribution of the liquid, means *comprising a packing* for effecting a fine distribution of the liquid, the means for effecting the predistribution of the liquid opening onto said means for effecting the fine distribution of the liquid which are disposed at an upper end of each of the passages of said first group of passages, both said means being disposed above an upper end of said generally vertical corrugated fins, supply means for supplying the liquid to said predistribution means, and means for supplying gas to the passages of said second group of passages.

27. An installation according to claim 26, wherein said supply means comprise means for creating a bath of liquid at the top of the exchanger.

28. An installation according to claim 27, wherein said supply means comprise means for regulating the level of said bath of liquid.

*29. An installation according to claim 26, wherein said openings are adapted to supply an excess flow rate of said liquid which is of the same order as a flow rate of said liquid which is vaporized in said heat exchanger.*

* * * * *

UNITED STATES PATENT AND TRADEMARK OFFICE

CERTIFICATE OF CORRECTION

PATENT NO. : RE 33,026

DATED : August 22, 1989

INVENTOR(S) : Pierre Petit, et al.,

It is certified that error appears in the above-identified patent and that said Letters Patent is hereby corrected as shown below:

On the title page:

Item [30] should read -- June 24, 1983 France.....83 10.472

Delete the inventor Jean-Francois Deschamps.

Signed and Sealed this

Seventeenth Day of July, 1990

*Attest:*

HARRY F. MANBECK, JR.

*Attesting Officer*

*Commissioner of Patents and Trademarks*